(12) United States Patent
Kitanaka

(10) Patent No.: US 9,350,283 B2
(45) Date of Patent: May 24, 2016

(54) INVERTER DEVICE FOR ELECTRIC VEHICLE

(75) Inventor: Hidetoshi Kitanaka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 90 days.

(21) Appl. No.: 14/359,479

(22) PCT Filed: Nov. 30, 2011

(86) PCT No.: PCT/JP2011/077721
§ 371 (c)(1),
(2), (4) Date: May 20, 2014

(87) PCT Pub. No.: WO2013/080346
PCT Pub. Date: Jun. 6, 2013

(65) Prior Publication Data
US 2014/0312821 A1    Oct. 23, 2014

(51) Int. Cl.
*H02P 7/00* (2016.01)
*H02P 23/00* (2016.01)
*H02P 21/06* (2016.01)

(52) U.S. Cl.
CPC ............. *H02P 23/004* (2013.01); *H02P 21/06* (2013.01); *B60L 2240/423* (2013.01); *Y02T 10/643* (2013.01); *Y02T 10/7258* (2013.01)

(58) Field of Classification Search
CPC .... H02H 7/0833; H02H 7/085; H02P 7/2906; H02P 7/2913; H02P 23/004; H02P 21/06; B60L 2240/423; Y02T 10/643; Y02T 10/7258
USPC ............... 318/434, 400.22, 400.23, 146, 148, 318/432; 323/274, 284, 234, 349, 320
See application file for complete search history.

(56) References Cited

U.S. PATENT DOCUMENTS 4,182,979 A * 1/1980 Douglas ................ G05D 17/02
                                                    318/434
4,600,874 A * 7/1986 Tupper .................. H02J 3/1892
                                                    318/798

(Continued)

FOREIGN PATENT DOCUMENTS

CN    101432961 A    5/2009
JP    H04-322191 A   11/1992

(Continued)

OTHER PUBLICATIONS

International Search Report (PCT/ISA/210) mailed on Feb. 14, 2012, by the Japanese Patent Office as the International Searching Authority for International Application No. PCT/JP2011/077721.

(Continued)

*Primary Examiner* — Rita Leykin
(74) *Attorney, Agent, or Firm* — Buchanan Ingersoll & Rooney PC

(57) ABSTRACT

An inverter device for an electric vehicle includes an inverter circuit that controls an electric motor connected to a wheel via a connecting member and a control unit that controls torque of the electric motor. The control unit includes a current control unit that executes control so that a q-axis current command for the electric motor matches a current flowing through the electric motor, and a limiter unit that puts limitations so that a magnitude of the q-axis current command does not become equal to or smaller than a preset predetermined value.

2 Claims, 4 Drawing Sheets

(56) References Cited

U.S. PATENT DOCUMENTS

| | | | | |
|---|---|---|---|---|
| 5,030,898 | A * | 7/1991 | Hokanson | B60L 11/06 318/144 |
| 7,728,536 | B2 * | 6/2010 | Katsumata | H02P 21/0035 318/400.02 |
| 8,736,222 | B2 * | 5/2014 | Hong | H02P 21/141 318/766 |
| 2010/0320951 | A1 | 12/2010 | Hasegawa et al. | |

FOREIGN PATENT DOCUMENTS

| JP | 4-364304 A | 12/1992 |
|---|---|---|
| JP | 6-245315 A | 9/1994 |
| JP | 9-023677 A | 1/1997 |
| JP | 2856564 B2 | 2/1999 |
| JP | 2000-023315 A | 1/2000 |
| JP | 2004-032954 A | 1/2004 |
| JP | 2005-102455 A | 4/2005 |
| JP | 2005-176515 A | 6/2005 |
| JP | 2005-269836 A | 9/2005 |
| JP | 2009-148079 A | 7/2009 |
| JP | 2011-173441 A | 9/2011 |

OTHER PUBLICATIONS

Written Opinion (PCT/ISA/237) mailed on Feb. 14, 2012, by the Japanese Patent Office as the International Searching Authority for International Application No. PCT/JP2011/077721.

The extended European Search Report issued on Aug. 27, 2015, by the European Patent Office in corresponding European Patent Application No. 11876596.5-1806. (5 pages).

Chinese Office Action with partial English translation, corresponding to Chinese Patent Application No. 201180075128.9, issued Jan. 12, 2016; 9 pages.

Korean Office Action with partial English translation, corresponding to Korean Patent Application No. 10-2014-7017222 issued Jan. 14, 2016; 7 pages.

* cited by examiner

INVERTER DEVICE FOR ELECTRIC VEHICLE

FIELD

The present invention relates to an inverter device for an electric vehicle for driving an electric vehicle.

BACKGROUND

As is generally known, an inverter device for an electric vehicle according to a conventional technique is generally configured such that torque generated by an electric motor connected to a wheel mounted on a truck of an electric-motor vehicle via gears and couplings (connecting members) is desirably controlled and driven (see, for example, Patent Literature 1). Further, as the electric motor, an induction electric motor is generally used.

CITATION LIST

Patent Literature

Patent Literature 1: Japanese Patent Application Laid-open No. 2011-173441

SUMMARY

Technical Problem

A problem of such an inverter device for an electric vehicle is that when an electric motor is driven in an area where torque is small and particularly when the polarity of torque generated by the electric motor fluctuates between positive and negative, internal constituent members such as gears and couplings vibrate due to allowance and machine noise is generated by the gears and the couplings. Some sort of improvement is required because such noise is noticeable under the conditions in which surrounding ambient noise is small, that is, the electric motor is being operated at a low speed and low torque.

The present invention has been achieved in view of the above, and an object of the present invention is to provide an inverter device for an electric vehicle that can suppress or reduce unnecessary machine noise generated by gears and couplings.

Solution to Problem

The present invention is directed to an inverter device for an electric vehicle that achieves the object. The inverter device includes an inverter circuit that controls an electric motor connected to a wheel via a connecting member, and a control unit that controls torque of the electric motor. The control unit includes a current control unit that executes control so that torque of the electric motor matches a torque command for the electric motor, or so that a current flowing through the electric motor matches a current command for the electric motor; and a limiter unit that puts limitations so that a magnitude of the torque command or a magnitude of the current command does not become equal to or smaller than a preset predetermined value.

Advantageous Effects of Invention

According to the present invention, it is possible to suppress or reduce unnecessary machine noise generated by gears and couplings.

DESCRIPTION OF EMBODIMENTS

Exemplary embodiments of an inverter apparatus for an electric vehicle according to the present invention will be explained below in detail with reference to the accompanying drawings. The present invention is not limited to the embodiments.

Embodiment

Figure 1:
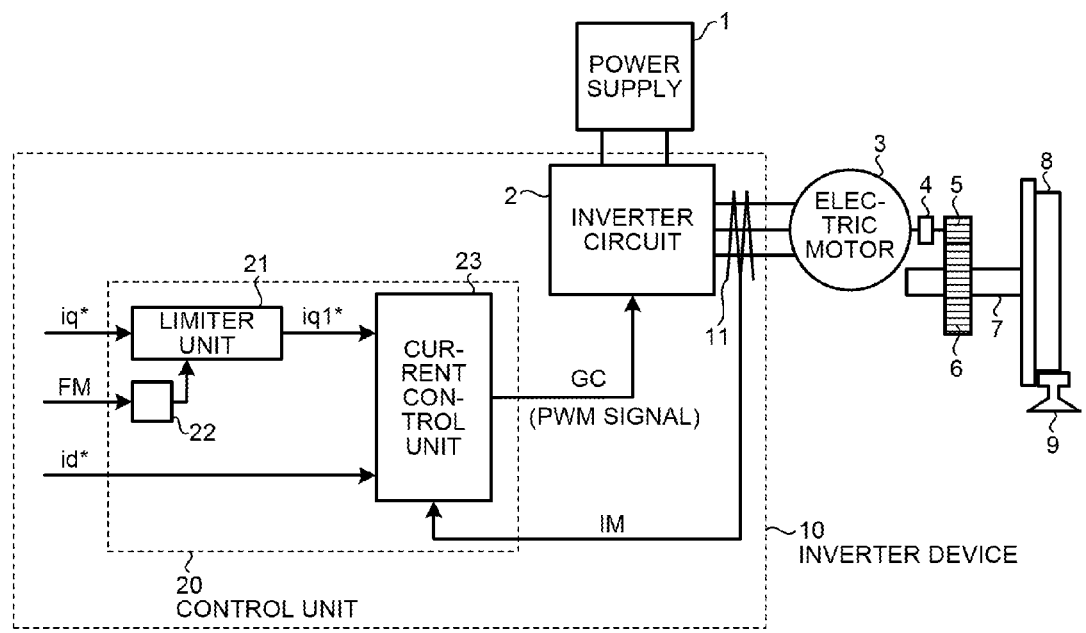
FIG. 1 is a configuration example of an inverter device for an electric vehicle according to an embodiment of the present invention.

FIG. 1 is a configuration example of an inverter device for an electric vehicle according to an embodiment of the present invention. As shown in FIG. 1, the inverter device for an electric vehicle of the present embodiment is configured by an inverter device 10 that receives power from a power supply 1 of an overhead wire or the like and drives an electric motor 3 that generates a rotary driving force.

The inverter device 10 includes an inverter circuit 2 that converts direct-current power to alternating-current (AC) power, a current detector 11 that measures a current of conductors output from the inverter circuit 2, and a control unit 20 that controls the inverter circuit 2.

An output of the inverter circuit 2 is connected to the electric motor 3, and the inverter circuit 2 drives the electric motor 3 by supplying AC power thereto. The electric motor 3 is, for example, a three-phase AC electric motor. On a rotation axis of the electric motor 3, a coupling 4 as a connecting member is arranged, and connected to an electric motor-side gear 5.

A wheel-side gear 6 is arranged so as to be engaged with the electric motor-side gear 5, and is fixed on an axle 7. Further, a wheel 8 is connected to the axle 7. As described above, constituent members that transfer a mechanical output to the wheel 8 via the axle 7 is provided on an output side of the electric motor 3. Further, the wheel 8 comes in contact with a rail 9, and the electric vehicle is driven by rotating the wheel 8.

Next, a configuration of the control unit 20 is explained. The control unit 20 includes a limiter unit 21, a lower-limit generating unit 22, and a current control unit 23.

A q-axis current command iq*, a d-axis current command id*, a speed signal FM of the electric motor 3, and an electric motor current-detection value IM detected by the electric current detector 11 are input to the control unit 20. In this case, the q-axis current command iq* is a signal corresponding to a command of the torque (a torque command for the electric motor 3) output by the electric motor 3, and the d-axis current command id* is a signal corresponding to a command of a magnetic flux in the electric motor 3. The current control unit 23 sets the q-axis current command (hereinafter "q-axis current command after the limiter", in order to distinguish the command from the q-axis current command before the limiter) iq1* and the d-axis current command id* after the limiter to be described later to current commands, and executes control so that a q-axis component and a d-axis component of the electric motor current-detection value IM are matched with respective current commands.

Figure 2:
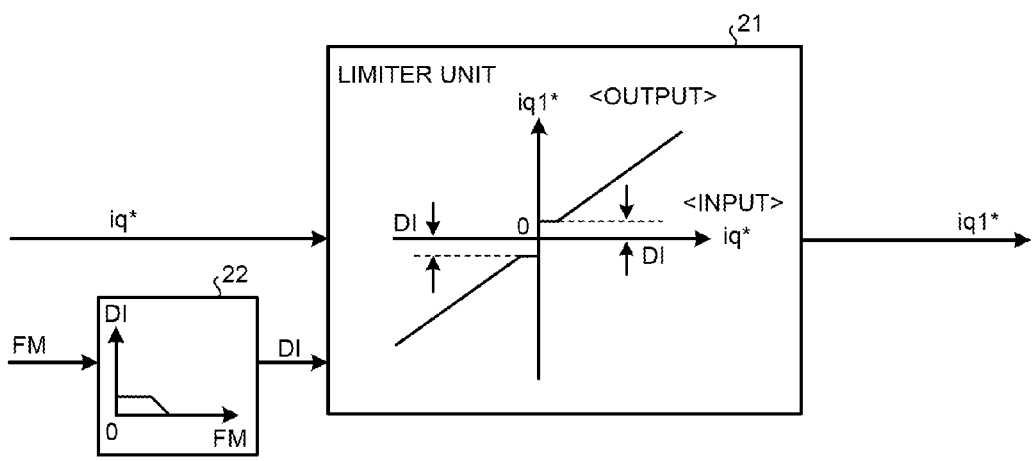
FIG. 2 is a configuration example of a limiter unit and a lower-limit generating unit according to the present embodiment.

FIG. 2 is a configuration example of a limiter unit and a lower-limit generating unit according to the present embodiment. In FIG. 2, the q-axis current command iq* is input to the limiter unit 21, and the speed signal FM is input to the lower-limit generating unit 22. Based on the speed signal FM, the lower-limit generating unit 22 is configured so as to generate a lower limit signal DI that is a predetermined value.

The q-axis current command iq* and the lower limit signal DI are input to the limiter unit 21. In an area where the speed signal FM is small, the lower-limit generating unit 22 operates so that the magnitude of the lower limit signal DI becomes a predetermined magnitude.

An output of the limiter unit 21 is controlled, for example, by input-output characteristics shown by a graph in the limiter unit 21. More specifically, the limiter unit 21 performs limiter processing so that the magnitude of the input q-axis current command iq* does not become equal to or smaller than the lower limit signal DI, and generates the q-axis current command iq1* after the limiter to output it to the current control unit 23. When the magnitude of the q-axis current command iq* is equal to or larger than the lower limit signal DI, the q-axis current command after the limiter iq1* becomes a value equal to the q-axis current command iq*.

In addition to the q-axis current command after the limiter iq1* generated as described above, the d-axis current command id* and the electric motor current-detection value IM are input to the current control unit 23. The current control unit 23 executes current control so that the q-axis component and the d-axis component of the electric motor current-detection value IM are matched with the q-axis current command after the limiter iq1* and the d-axis current command after the limiter id*, respectively, and generates a gate control signal (PWM signal) GC according to this current control to output it to the inverter circuit 2. In the inverter circuit 2, a switching device (not shown) is controlled by the gate control signal GC, and necessary power is supplied to the electric motor 3.

According to the control described above, the electric motor 3 is driven by a current to be determined by the q-axis current command after the limiter iq1* and the d-axis current command after the limiter id*.

Figure 3:
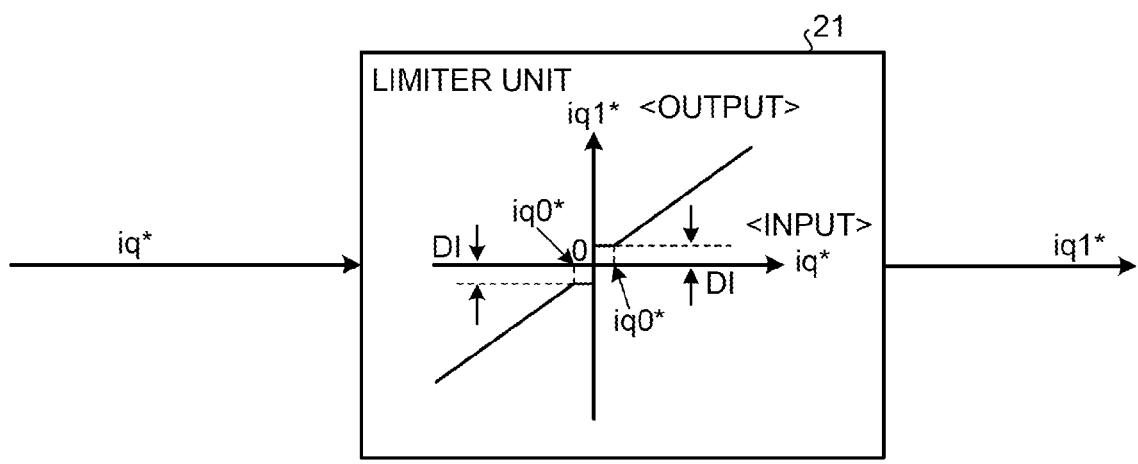
FIG. 3 is another configuration example of a limiter unit and a lower-limit generating unit different from that shown in FIG. 2 according to the present embodiment.

In FIG. 2, the lower-limit generating unit 22 is configured so as to generate the lower limit signal DI based on the speed signal FM; however, it is not limited to the configuration described above. For example, as shown in FIG. 3, a value of the DI in the limiter unit 21 may be set to a fixed value, and in a case where the magnitude of the q-axis current command iq* is equal to or smaller than an ig0* being a predetermined value, the q-axis current command after the limiter iq1* being an output of the limiter unit 21 may be set to the DI to be output.

A configuration of a conventional inverter device is explained here. In FIG. 1, for example, the limiter unit 21 and the lower-limit generating unit 22 are not present in the conventional inverter device. That is, the q-axis current command iq* and the d-axis current command id* are input to the current control unit 23, and the conventional inverter device is driven by a current to be determined according to the input q-axis current command iq* and d-axis current command id*.

Figure 4:
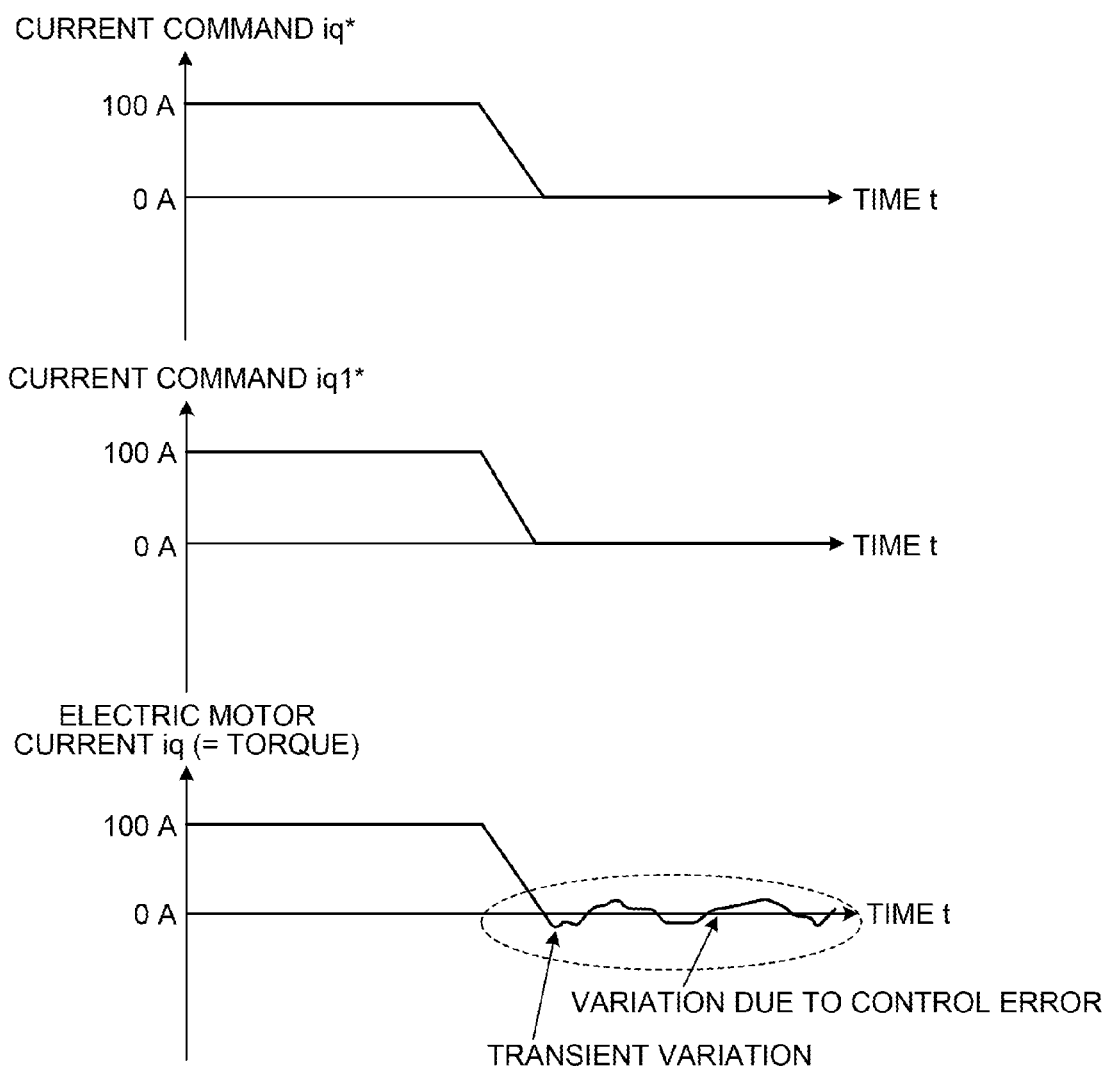
FIG. 4 is an explanatory diagram of operations in a case where a technique according to the present embodiment is not applied.

Next, operations in a case where the technique according to the present embodiment is applied and those in a case where the technique is not applied (a conventional configuration) are explained. FIG. 4 is an explanatory diagram of the operations in a case where the technique according to the present embodiment is not applied.

In FIG. 4, the top diagram depicts the q-axis current command iq*, the middle diagram depicts the q-axis current command after the limiter iq1* (as described above, in the conventional configuration, "q-axis current command iq*"="q-axis current command after the limiter iq1*"), and the bottom diagram depicts the electric motor current iq (corresponding to the torque being the q-axis component of the electric motor current-detection value IM).

In the example shown in FIG. 4, the current command is suppressed and the torque generated by the electric motor 3 is reduced during the operation at the time of the q-axis current command iq*=100 A. Further, the q-axis current command iq* is reduced in a ramp-shaped manner, and then is set to 0 A. At this time, in the electric motor current iq, transient variation occurs or variation due to a control error occurs because of restrictions (for example, an operation delay of the control unit 20) of control performance of the inverter device. The electric motor current iq fails to be kept to just zero, and varies with zero as a border. That is, the polarity of the magnitude of the torque of the electric motor 3 changes.

In such a state, because the direction of force (torque) output from the rotation axis of the electric motor 3 varies, vibrations occur and the machine noise described above is generated in constituent members of the couplings and the gears. The machine noise is noticeable under conditions in which surrounding ambient noise is small, that is, in an area where the electric vehicle is being operated at a low speed and the speed signal FM of the electric motor 3 is small.

Figure 5:
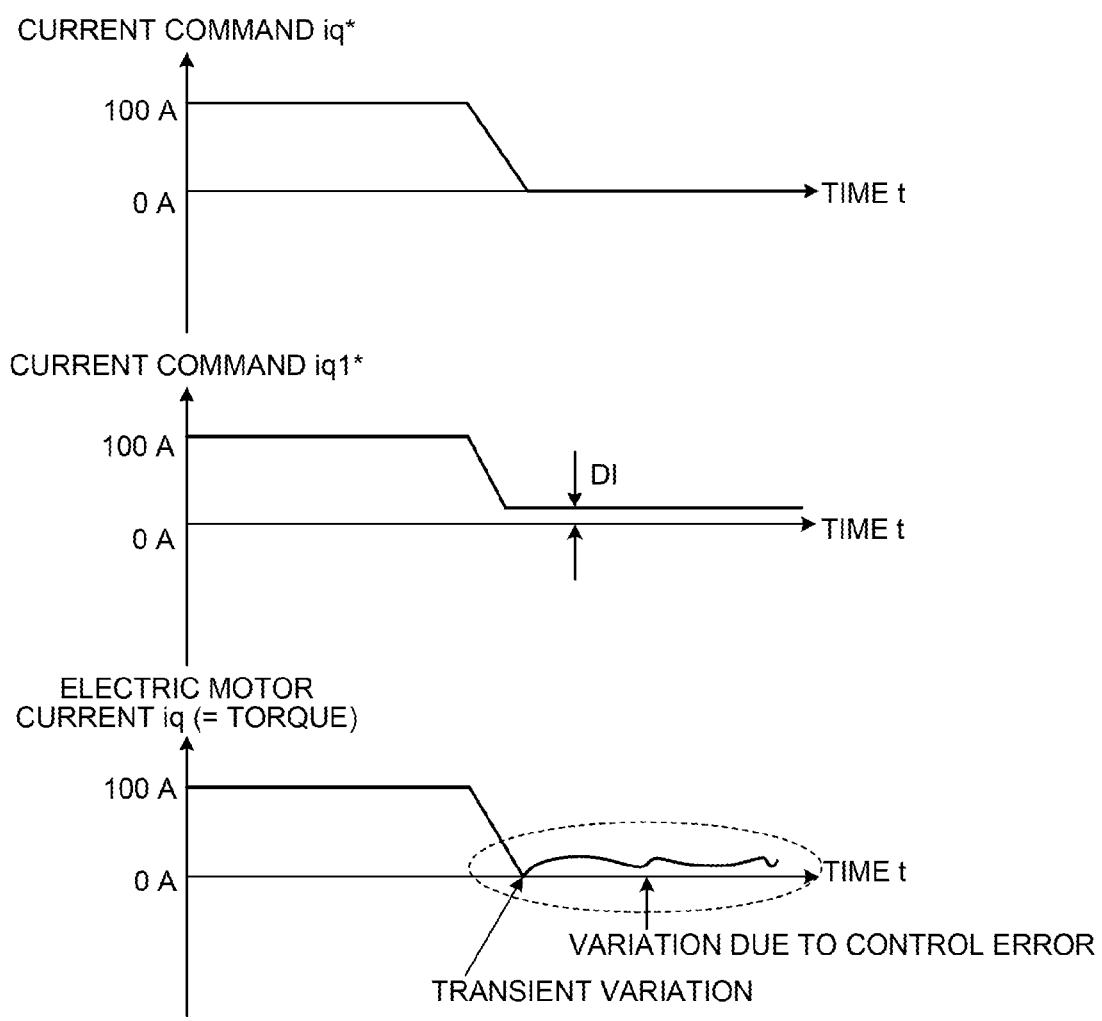
FIG. 5 is an explanatory diagram of operations in a case where the technique according to the present embodiment is applied.

On the other hand, FIG. 5 is an explanatory diagram of operations in a case where the technique according to the present embodiment is applied. The top diagram depicts the q-axis current command iq*, the middle diagram depicts the q-axis current command after the limiter iq1*, and the bottom diagram depicts the electric motor current iq (corresponding to the torque being the q-axis component of the electric motor current-detection value IM).

Similarly to FIG. 4, in the example shown in FIG. 5, the current command is suppressed and the torque generated by the electric motor 3 is reduced during the operations at the time of the q-axis current command iq*=100 A, the q-axis current command iq* is reduced in a ramp-shaped manner, and then is set to 0 A (see the top diagram of FIG. 5). On the other hand, according to operations of the lower-limit generating unit 22 and the limiter unit 21, even when the q-axis current command after the limiter iq1* is reduced down to 0 A, a component of the lower limit signal DI remains and this component is output (see the middle diagram of FIG. 5).

In the electric motor current iq, transient variation occurs or variation due to a control error occurs because of restrictions of the control performance (a control operation delay of the control unit 20) of the inverter device, which is similar to the conventional case. However, in the case where the technique according to the present embodiment is applied, the lower limit signal DI equivalent to the variation quantity is generated and the electric motor current iq equivalent to this component is added, and therefore the electric motor current iq is prevented from varying with zero as a border (see the bottom diagram of FIG. 5). As a result, the polarity of the magnitude of the torque of the electric motor 3 can be prevented from changing.

As explained above, according to the inverter device for an electric vehicle of the present embodiment, the magnitude of the q-axis current command iq* is limited so as not become equal to or smaller than a preset predetermined value. Therefore, the direction of force (torque) output from the rotation axis of the electric motor 3 can be prevented from changing, vibrations of the constituent members of the couplings and the gears are not generated, and unnecessary machine noise generated by the gears and the couplings can be suppressed or reduced.

This type of machine noise is noticeable under conditions in which surrounding ambient noise is small, that is, in an area where the electric vehicle is being operated at a low speed and the speed signal FM of the electric motor 3 is small. Therefore, in the lower-limit generating unit 22, it is possible to generate the lower limit signal DI only in the area where the speed signal FM of the electric motor is small. In a state where the speed signal FM has a certain level of speed and the machine noise is not so noticeable being drown out by the ambient noise, it is possible to satisfy the lower limit signal DI=0. Accordingly, because unnecessary limitations do not need to be continuously added to the q-axis current command iq*, deterioration of the control performance of the electric motor 3 can be minimized.

Further, based on the use of the electric vehicle, a value of the lower limit signal DI is preferably set to about 10% or less of maximum torque (current) of the electric motor 3. When the value of the lower limit signal DI is set to about 10% or less, there is no practical problem. When the value of the lower limit signal DI is increased too much, it is inconvenient in a case of slight acceleration/deceleration that requires small torque. When the value of the lower limit signal DI is excessively reduced, the electric motor current iq varies with zero as a border by the transient variation due to the control error mentioned above or control operation delay, so that any effects are not brought about.

Accordingly, the lower limit signal DI is preferably set to a value at least higher than a variation value (=a variation value of the electric motor current equivalent to that of the torque of the electric motor 3) of the electric motor current iq generated due to a control error or a control operation delay of the control unit 20. That is, the lower limit signal DI is preferably set to a value in which the q-axis current command after the limiter iq1* is capable of keeping a state where the polarity of the torque output by the electric motor 3 does not fluctuate between positive and negative.

The present embodiment has been explained as a configuration in which the q-axis current command iq* is subjected to the limiter processing. Further, identical effects can be obtained with a configuration in which a torque command (not shown) corresponding to the q-axis current command is subjected to the limiter processing. That is, in place of the configuration in which the current command is subjected to the limiter processing, the present embodiment may have the configuration in which the torque command is subjected to the limiter processing. Note that reduction between the torque command and the current command (the q-axis current command) is well known to those skilled in the art.

Furthermore, the configurations according to the above embodiment are only an example of the contents of the present invention and they can be combined with other well-known techniques, and it is needless to mention that the present invention can be configured while modifying them without departing from the scope of the invention, such as omitting a part the configurations.

INDUSTRIAL APPLICABILITY

As described above, the present invention is useful as an inverter device for an electric vehicle that can suppress or reduce unnecessary machine noise generated by gears and couplings.

REFERENCE SIGNS LIST

1 Power supply
2 Inverter circuit
3 Electric motor
4 Coupling
5 Electric motor-side gear
6 Wheel-side gear
7 Axle
8 Wheel
9 Rail
10 Inverter device
11 Current detector
20 Control unit
21 Limiter unit
22 Lower-limit generating unit
23 Current control unit

The invention claimed is:

1. An inverter device for an electric vehicle, comprising:
an inverter circuit that controls an electric motor connected to a wheel via a connecting member; and
a control unit that controls torque of the electric motor,
wherein the control unit includes:
 a current control unit that executes control so that torque of the electric motor matches a torque command for the electric motor, or so that a current flowing through the electric motor matches a current command for the electric motor; and
 a limiter unit that puts limitations so that a magnitude of the torque command or a magnitude of the current command does not become equal to or smaller than a preset predetermined value,
wherein in an area where a magnitude of the torque command or the current command is small, the predetermined value is set to a value in which a polarity of torque output by the electric motor does not fluctuate between positive and negative.

2. The inverter device for an electric vehicle according to claim 1, further comprising a lower-limit generating unit that generates the predetermined value, based on a signal corresponding to a speed of the electric motor.

* * * * *